United States Patent [19]
Iggulden

[11] Patent Number: 5,946,676
[45] Date of Patent: Aug. 31, 1999

[54] INFORMATION DELIVERY SYSTEM

[75] Inventor: Jerry Iggulden, Santa Clarita, Calif.

[73] Assignee: Ithaca Media Corporation, La Canada, Calif.

[21] Appl. No.: 08/963,367

[22] Filed: Nov. 3, 1997

[51] Int. Cl.$^6$ .................................................. G06F 17/30
[52] U.S. Cl. ...................................... 707/1; 707/2; 707/3
[58] Field of Search ................................. 707/10, 9, 104, 707/102, 100, 1, 2, 3

[56] References Cited

U.S. PATENT DOCUMENTS

| | | | |
|---|---|---|---|
| 5,115,310 | 5/1992 | Takano | 348/722 |
| 5,146,552 | 9/1992 | Cassorla et al. | 707/512 |
| 5,367,621 | 11/1994 | Cohen et al. | 395/154 |
| 5,414,757 | 5/1995 | Thompson | 379/88 |
| 5,455,910 | 10/1995 | Johnson et al. | 345/302 |
| 5,524,193 | 6/1996 | Covington et al. | 395/154 |
| 5,568,602 | 10/1996 | Callahan et al. | 345/302 |
| 5,583,980 | 12/1996 | Anderson | 395/173 |
| 5,614,940 | 3/1997 | Cobbley et al. | 348/7 |
| 5,617,565 | 4/1997 | Augenbraun et al. | 707/4 |
| 5,649,186 | 7/1997 | Ferguson | 707/10 |
| 5,689,641 | 11/1997 | Ludwig et al. | 395/200.71 |
| 5,758,079 | 5/1998 | Ludwig et al. | 395/200.34 |
| 5,761,662 | 6/1998 | Dasan | 707/10 |
| 5,802,518 | 9/1998 | Karaev et al. | 707/9 |

*Primary Examiner*—Wayne Amsbury
*Assistant Examiner*—Cheryl Lewis
*Attorney, Agent, or Firm*—Blakely, Sokoloff, Taylor & Zafman LLP

[57] ABSTRACT

A system delivers information relating to a time sequence of events, either factual or fictional. A set of reports about the events is stored in a data storage device, each report containing information relating to a specific period of time, such as a day, a week, a month, etc. The period of time covered by each report is contiguous with that of another report in the set. A subset of the reports is retrieved from the data storage device and transferred to a user's computer memory. When accessed by the user, the information contained in the subset of reports is presented in accordance with a predetermined temporal relationship between real time and the span of time depicted in the set of reports. The user can access reports corresponding to earlier periods of time, but cannot access reports relating to later periods of time. The user's experience thereby simulates the experience of witnessing the events as they unfold in real time.

18 Claims, 2 Drawing Sheets

INFORMATION DELIVERY SYSTEM

BACKGROUND OF THE INVENTION

1. Field of the Invention

The present invention relates generally to the field of information delivery. More particularly, the invention relates to a multimedia presentation system that provides reports of events in a fixed temporal relationship to the factual or fictional occurrence of such events.

2. Prior Art

Storytelling is an art form with its origins at the very beginnings of human communications. Regardless of the format or media used, one of the primary objectives of the storyteller is to achieve a sense of audience involvement. Over time, various techniques have been developed to achieve this objective. For example, the popular 1950's television program You Are There portrayed historical events as if they were actually occurring as the audience watched.

Techniques that attempt to involve the audience as witnesses to factual or fictional events generally must use some form of time compression, since the actual span of the events may range anywhere from days to years. Such compression detracts from the sense of reality that an audience experiences when witnessing actual events in real time.

Rapid advances in personal computer technology and the popularity of the Internet has made possible new forms of storytelling with multimedia experiences. The challenge of achieving greater audience involvement still remains.

SUMMARY OF THE INVENTION

The present invention provides a method for delivering information relating to a time sequence of events, either factual or fictional. A set of reports about the events is stored in a data storage device, each report containing information relating to a specific period of time, such as a day, a week, a month, etc. The period of time covered by each report is contiguous with that of another report in the set. A subset of the reports is retrieved from the data storage device and transferred to a user's computer memory. When accessed by the user, the information contained in the subset of reports is presented in accordance with a predetermined temporal relationship between real time and the span of time depicted in the set of reports. The user can access reports corresponding to earlier periods of time, but cannot access reports relating to later periods of time. The user's experience thereby simulates the experience of witnessing the events as they unfold in real time.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

Figure 1:
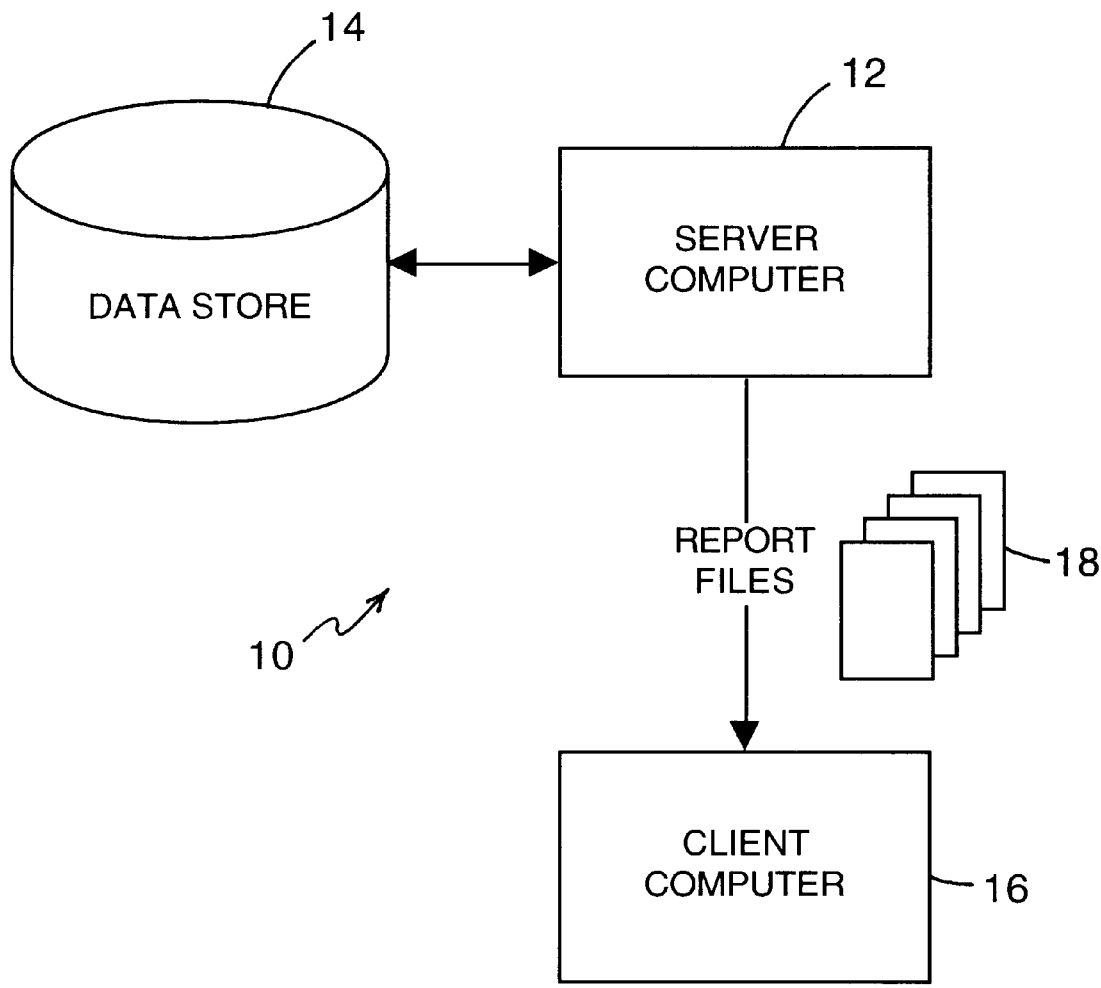
FIG. 1 is a block diagram of an information delivery system in accordance with the present invention.

FIG. 1 is a block diagram of an information delivery system 10 in accordance with the present invention. In this exemplary embodiment, a server computer 12 has an associated data storage device 14. The server computer 12 communicates with a client computer 16. Server computer 12 is preferably connected to the Internet as a host on the World Wide Web to facilitate access by a large number of remote client computers.

Data storage device 14 stores report files 18 for delivery to client computer 16. The report files contain information relating to a particular story or "chronicle". A chronicle may recount actual historical events or may be a purely fictional account. A complete chronicle will typically span an extended period of time ranging from a matter of days to perhaps several years. Each report within a chronicle contains information about a specific segment of time, preferably on the order of one or a few days. A typical chronicle might be, for example, an account of an expedition, such as an ascent of Mt. Everest. Such a chronicle may span several months, including organization of the expedition, preparation, travel to a base camp and then the actual ascent. Each report could be in the form of a journal entry, recounting a single day's activities. Some reports might cover several days' activities. Each report may comprise the text of a journal entry, and preferably includes multimedia materials to enhance the text, such as photographs, maps, film clips, narrations, etc.

The reports are presented to the system user by the client computer 16. Each report is presented in accordance with a predetermined temporal relationship between real time and the time depicted in the chronicle. For example, if the chronicle contains daily reports, successive reports may be available for presentation to the system user on a daily basis. Thus, the experience for the system user is as if the events depicted in the chronicle are occurring in real time. As explained below, the system timing is initialized when a particular chronicle is first accessed. This establishes the relationship or offset between the beginning time depicted in the chronicle and the beginning time, in real time, of presentation of the chronicle to the system user.

To maximize the system user's sense of involvement in the chronicle, it is expected that the times at which reports will be available for presentation will generally correspond on a one-to-one basis with the passage of time depicted in the chronicle. However, chronicles that span particularly long periods of time may be compressed so that the temporal relationship between real time and the periods of time depicted in the chronicle is other than one-to-one.

Figure 2:
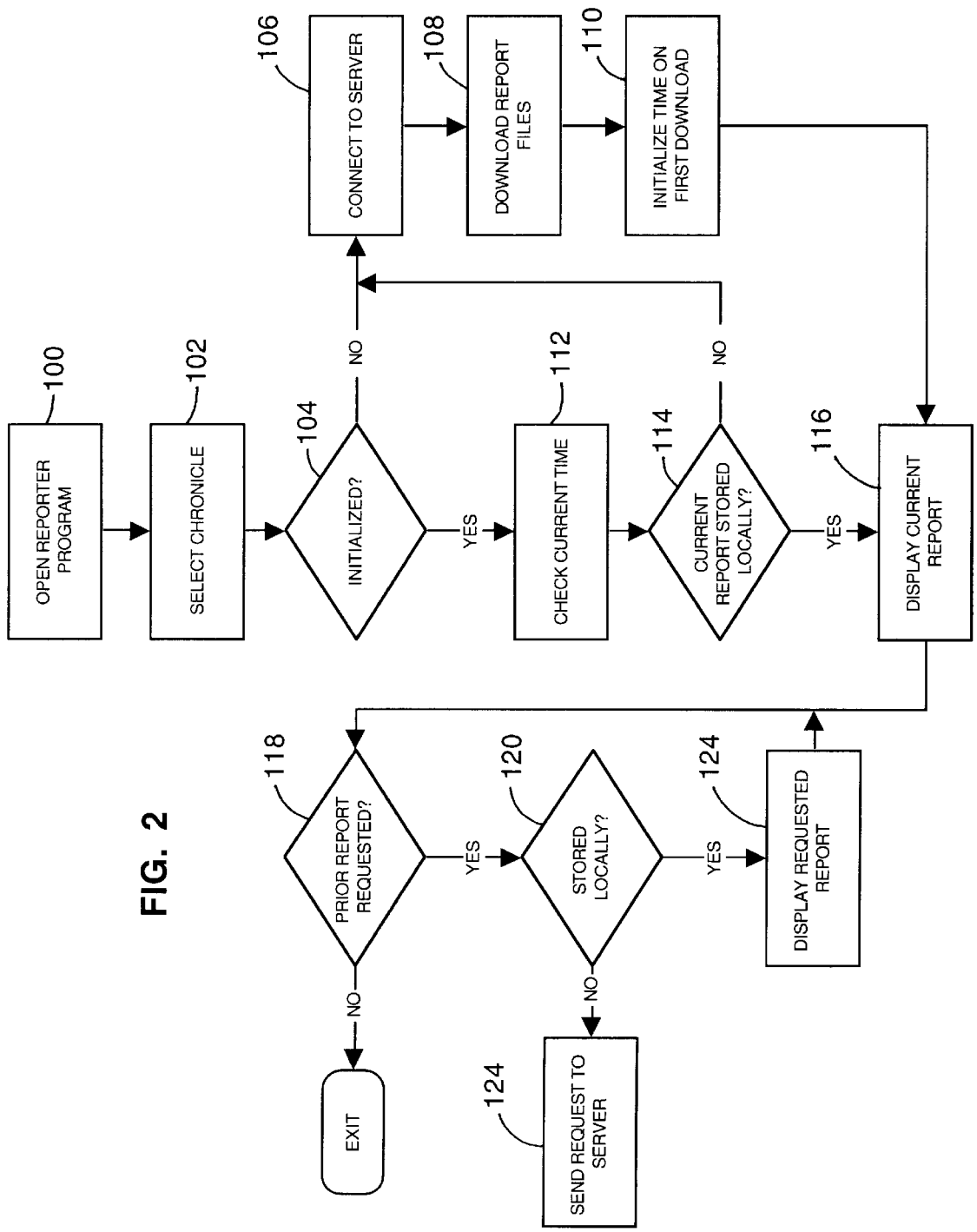
FIG. 2 is a functional flow diagram illustrating operation of the present invention.

FIG. 2 is a functional flow diagram illustrating operation of the present invention. Although the chronicle report files are maintained by a 25 central server computer, report delivery is preferably conducted autonomously on the client computer with a reporter program. Beginning at step 100, the user opens the reporter program on the client computer. At step 102, the user next selects the chronicle to be experienced. It is anticipated that users may wish to experience several chronicles concurrently. Selection may be conveniently accomplished using an on-screen menu. At step 104, the reporter program checks to see if the selected chronicle has been initialized. If not, the program will automatically connect to the server computer at step 106. Report files for the selected chronicle are then downloaded from the server computer to the client computer at step 108. A number of individual report files are downloaded for storage in the client computer. The number of files downloaded will depend, to a large extent, on the size of the files and the available storage capacity of the client computer. In some cases, an entire chronicle may be downloaded at initialization, whereas in other cases, a relatively small number of report files will be downloaded during each connection to the server. When report files for a selected chronicle are first accessed and downloaded to the client computer, a time marker is initialized at step 110. This time marker will be used to maintain a fixed temporal relationship between delivery of the reports to the user and the elapsed time between reports in the chronicle.

If the selected chronicle has already been initialized, the reporter program checks the current time at step 112. The program then determines which report corresponds to the current time. At step 114, the program checks to see if the appropriate report for the current time is stored locally on the client computer. If it is not, the program branches to step 106 to connect to the server and retrieve additional report files. If the current report is resident on the client computer, or upon retrieval from the server, it is presented at step 116. The user experiences the report as if the events described therein have occurred in the time that has elapsed since display of the previous report. Ordinarily, the user will terminate a session with a particular chronicle once the current report has been presented. In some cases, however, the user may wish to experience a prior report, such as when the user has not accessed the chronicle for some period of time. A request for a prior report is processed at step 118. The reporter program checks to see if the requested report is still stored locally on the client computer. If not, the requested report is retrieved from the server at step 122. In either case, the requested report is presented to the user at step 124. It should be noted that although the user can request presentation of a prior report, the system does not permit the user to request a report corresponding to a time later than the current time. Thus, the user cannot "look ahead" in the chronicle, but rather must experience it as if it were occurring in real time.

Although the present invention has been described in terms of an embodiment in which chronicles are stored in a central server, this is not a limiting feature of the invention. Chronicles may also be stored in media that may be directly accessed by the client computer such as CD-ROM or DVD. In such case, reports may be retrieved individually rather than in batches. In all other respects, operation of the system is the same regardless of whether the chronicles are stored centrally or locally.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A method for delivering information relating to a time sequence of events, said method comprising the steps of:
   (a) storing a set of reports in a first data storage device, each member of said set of reports containing information depicting events occurring within a period of time contiguous with a period of time covered in at least one other member of said set of reports;
   (b) presenting information contained in a first report;
   (c) retrieving a second report from said set of reports;
   (d) presenting information contained in said second report in accordance with a predetermined temporal relationship between real time and the periods of time depicted in the first and second reports.

2. The method of claim 1 wherein said predetermined temporal relationship is a one-to-one relationship.

3. The method of claim 2 wherein the predetermined temporal relationship further comprises an offset.

4. The method of claim 1 wherein said events comprise historical events.

5. The method of claim 1 wherein said events comprise fictional events.

6. The method of claim 1 wherein said report is a member of a subset of reports retrieved concurrently.

7. The method of claim 6 further comprising the step of storing said subset of reports in a second data storage device.

8. The method of claim 7 wherein the first data storage device is a remote device and the second data storage device is a local device.

9. The method of claim 8 wherein said first data storage device is coupled to a server on the World Wide Web.

10. A system for delivering information relating to a time sequence of events, said system comprising:
    (a) a first data storage device for storing a set of reports, each member of said set of reports containing information depicting events occurring within a period of time contiguous with a period of time covered in at least one other member of said set of reports;
    (b) means for retrieving selected reports from said set of reports;
    (c) means for presenting information contained in first and second selected reports in accordance with a predetermined temporal relationship between real time and the periods of time depicted in the set of reports.

11. The system of claim 10 wherein said predetermined temporal relationship is a one-to-one relationship.

12. The system of claim 11 wherein the predetermined temporal relationship further comprises an offset.

13. The system of claim 10 wherein said events comprise historical events.

14. The system of claim 10 wherein said events comprise fictional events.

15. The system of claim 10 wherein said report is a member of a subset of reports retrieved concurrently.

16. The system of claim 15 further comprising a second data storage device for storing said subset of reports.

17. The system of claim 16 wherein the first data storage device is a remote device and the second data storage device is a local device.

18. The system of claim 17 wherein said first data storage device is coupled to a server on the World Wide Web.

* * * * *